(12) United States Patent
Stepanov et al.

(10) Patent No.: US 9,275,117 B1
(45) Date of Patent: Mar. 1, 2016

(54) FAST DEPENDENCY MINING USING ACCESS PATTERNS IN A STORAGE SYSTEM

(71) Applicants: Mikhail V. Stepanov, St. Petersburg (RU); Alexey Fomin, St. Petersburg (RU)

(72) Inventors: Mikhail V. Stepanov, St. Petersburg (RU); Alexey Fomin, St. Petersburg (RU)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 13/706,487

(22) Filed: Dec. 6, 2012

(51) Int. Cl.
*G06F 17/30* (2006.01)

(52) U.S. Cl.
CPC .... *G06F 17/30539* (2013.01); *G06F 17/30598* (2013.01)

(58) Field of Classification Search
None
See application file for complete search history.

(56) References Cited

U.S. PATENT DOCUMENTS

| | | | |
|---|---|---|---|
| 5,206,939 A | 4/1993 | Yanai et al. | |
| 5,742,792 A | 4/1998 | Yanai et al. | |
| 5,778,394 A | 7/1998 | Galtzur et al. | |
| 5,845,147 A | 12/1998 | Vishlitzky et al. | |
| 5,857,208 A | 1/1999 | Ofek | |
| 6,622,221 B1 | 9/2003 | Zahavi | |
| 6,721,870 B1 | 4/2004 | Yochai | |
| 6,807,619 B1 | 10/2004 | Ezra | |
| 7,143,393 B1 | 11/2006 | Ezra | |
| 7,747,624 B2 * | 6/2010 | Campos et al. | 707/737 |
| 7,822,731 B1 | 10/2010 | Yu et al. | |
| 7,822,939 B1 | 10/2010 | Veprinsky et al. | |
| 7,882,106 B2 * | 2/2011 | Birdwell et al. | 707/736 |
| 7,949,637 B1 | 5/2011 | Burke | |
| 8,078,813 B2 | 12/2011 | LeCrone et al. | |
| 2002/0099702 A1 * | 7/2002 | Oddo | 707/6 |
| 2006/0112190 A1 * | 5/2006 | Hulten et al. | 709/238 |
| 2007/0219990 A1 * | 9/2007 | Crivat et al. | 707/6 |
| 2009/0070541 A1 | 3/2009 | Yochai | |
| 2009/0106210 A1 * | 4/2009 | Slezak et al. | 707/3 |
| 2009/0271363 A1 * | 10/2009 | Bayliss | 707/2 |
| 2010/0023515 A1 * | 1/2010 | Marx | 707/6 |
| 2011/0153664 A1 * | 6/2011 | Lang et al. | 707/776 |
| 2011/0276682 A1 * | 11/2011 | Ding et al. | 709/224 |

OTHER PUBLICATIONS

Zhenmin Li et al., "C-Miner: Mining Block Correlations in Storage Systems," In Proceedings of the 3rd USENIX Symposium on File and Storage Techniques (FAST), 2004, 14 pp.
Edgar Chavez et al., "Searching in Metric Spaces," ACM Computing Surveys, vol. 33, No. 3, Sep. 2001, pp. 273-321.

(Continued)

*Primary Examiner* — Robert Beausoliel, Jr.
*Assistant Examiner* — Pedro J Santos
(74) *Attorney, Agent, or Firm* — Muirhead and Saturnelli, LLC

(57) ABSTRACT

A system and method is provided in which access patterns of data blocks are used to predict future accesses to the data blocks. One of the types of patterns that may be used in connection with the system described herein is depended blocks. Dependent blocks are blocks that are often referenced one after another in a short period of time. For example, one block (block b) is commonly referenced after another block (block a) a noted time period. The system described herein provides a block dependency algorithm that enables a search task involving searching of block dependencies with respect to proposed dependency definitions. In an embodiment, the search task may be performed based on using of a branch and bound methodology. A search tree is built in which a set of activity vectors (V) are ordered, and a search algorithm is used to traverse and "prune" branches of the tree.

16 Claims, 14 Drawing Sheets

(56) References Cited

OTHER PUBLICATIONS

Gisli R. Hjaltason et al., "Index-Driven Similarity Search in Metric Spaces," ACM Transactions on Database Systems, vol. 28, No. 4, Dec. 2003, pp. 517-580.

U.S. Appl. No. 12/319,122, filed Dec. 31, 2008, Burke, et al.
U.S. Appl. No. 12/586,837, filed Sep. 29, 2009, LeCrone et al.
U.S. Appl. No. 12/592,988, filed Dec. 7, 2009, Martin et al.

* cited by examiner

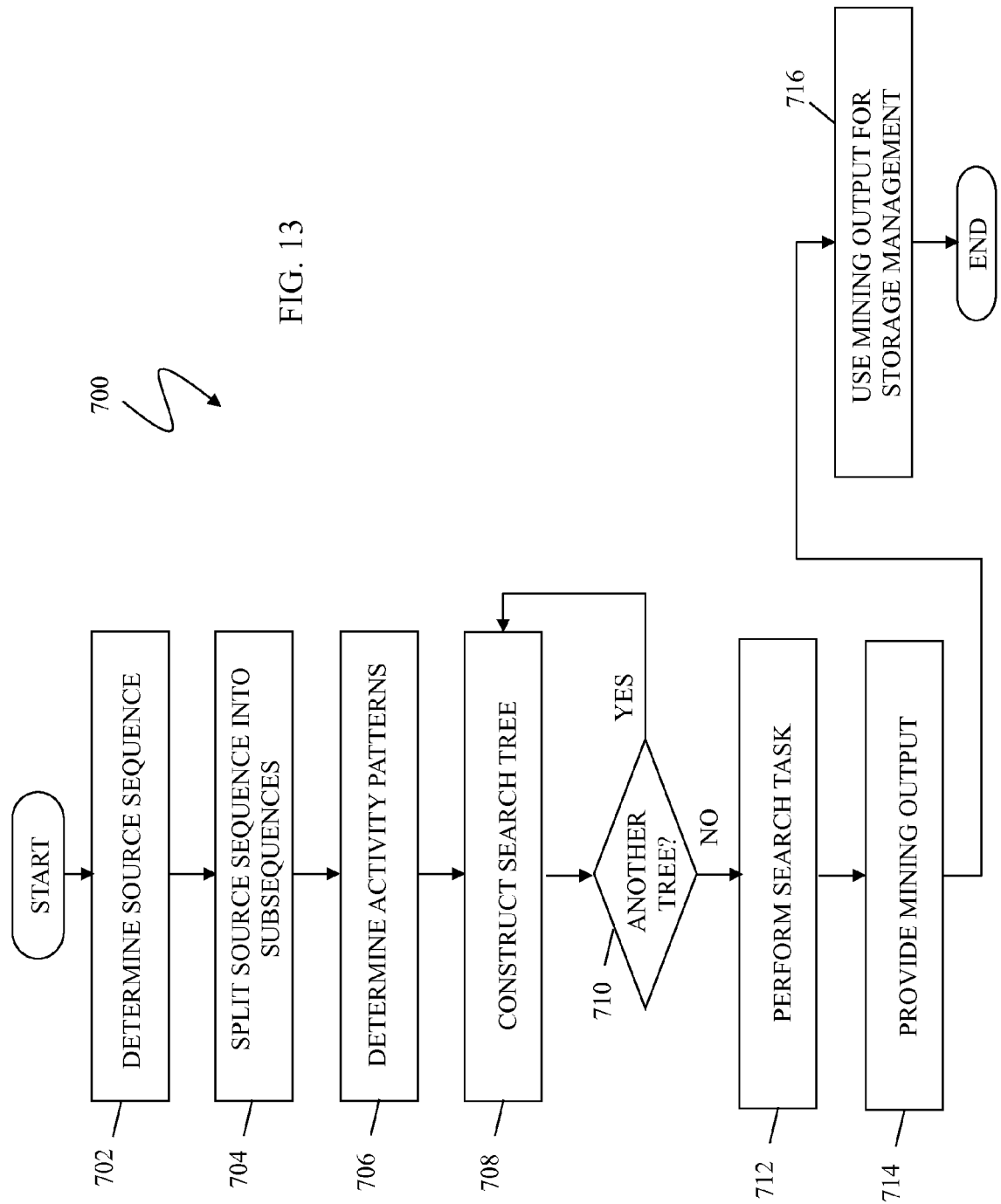

FAST DEPENDENCY MINING USING ACCESS PATTERNS IN A STORAGE SYSTEM

TECHNICAL FIELD

This application relates to storage devices and, more particularly, to the field of data management of data stored on storage devices.

BACKGROUND OF THE INVENTION

Host processor systems may store and retrieve data using storage devices containing a plurality of host interface units (host adapters), disk drives, and disk interface units (disk adapters). Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek, which are incorporated herein by reference. The host systems access the storage device through a plurality of channels provided therewith. Host systems provide data and access control information through the channels of the storage device and the storage device provides data to the host systems also through the channels. The host systems do not address the disk drives of the storage device directly, but rather, access what appears to the host systems as a plurality of logical volumes. Different sections of the logical volumes may or may not correspond to the actual disk drives.

Information Lifecycle Management (ILM) concerns the management of data throughout the data's lifecycle. The value of data may change over time and, accordingly, the needs for the storage and accessibility of the data may change during the lifecycle of the data. For example, data that is initially accessed often may, over time, become less valuable and the need to access that data become more infrequent. It may not be efficient for such data infrequently accessed to be stored on a fast and expensive storage device. On the other hand, older data may suddenly become more valuable and, where once accessed infrequently, become more frequently accessed. In this case, it may not be efficient for such data to be stored on a slower storage system when data access frequency increases.

Logical devices containing the data that has been stored across multiple disk drives of a storage system may be accessed at different frequencies. Data dependency mining techniques are known for improving the effectiveness of storage caching, prefetching, data layout and disk scheduling that are based on determining access correlations and patterns among blocks of stored data of the storage system, For example, data prefetching relates to obtaining data from a device prior to receiving an actual request for the data, such as a request from a host. Data prefetching techniques try to identify or recognize a pattern of I/O requests in order to try and predict what data will be requested next and prefetch data based on such prediction. For a detailed discussion of information access and management in a storage system using prefetch techniques, reference is made to U.S. Pat. No. 7,822,731 to Yu et al. entitled "Techniques for Management of Information Regarding a Sequential Stream," which is incorporated herein by reference. Another known technique is the C-miner algorithm for dependency mining that provides an algorithm for mining block correlations in a storage system (see, e.g., Zhenmin Li et al., "C-Miner: Mining Block Correlations in Storage Systems," In Proceedings of the 3rd *USENIX Symposium on File and Storage Techniques* (FAST), 2004, 14 pp., which is incorporated herein by reference).

Existing techniques for performing, data prefetching and/or other data layout or caching techniques, may include inefficiencies and/or may involve complex data mining algorithms. Accordingly, it would be desirable to provide an efficient and fast dependency mining technique for a storage system.

SUMMARY OF THE INVENTION

According to the system described herein, a method of performing dependency mining includes determining a block data source sequence. The block data source sequence is split into a plurality of subsequences. An activity pattern is determined for each of the plurality of subsequences. At least one search tree is constructed based on the activity pattern of each of the plurality of subsequences. A search task is performed using the at least one search tree and based on block dependency criteria. A dependency mining search result is output from the search task. Subsets of the plurality of subsequences may be grouped into a plurality of subset groups according to weighting characteristics of the block dependency criteria for each access pattern of the plurality of subsequences. Each of the plurality of subset groups may include access patterns of blocks having a same weight. More than one search tree may be constructed, and the search task may include traversing the more than one search tree. The dependency mining search result may be an aggregated result of traversing the more than one search tree. The access pattern may be an activity vector that identifies occurrences of a particular block in each of the plurality of subsequences. The block dependency criteria may include, for a block (a) and a block (b), the block (b) is depended from block (a) if:

$$d_E(a,b) \leq (1-2p_{threshold}) \cdot \text{weight}(a) + \text{weight}(b)$$

$$\text{weight}(a) \geq m$$

where weight is a number of subsequences where identified block was active, m is a user defined threshold for the minimum number of subsequences where the identified block was active, $p_{threshold}$ is a user defined threshold from 0 to 1, and $d_E$ is a Euclidian distance in computational geometry. Performing the search task may include traversing the at least one search tree and pruning branches of the search tree according to a search radius criteria. The method may further include using the block dependency mining result in a storage management process.

According further to the system described herein, a non-transitory computer readable medium stores software for performing dependency mining. The software includes executable code that determines a block data source sequence. Executable code is provided that splits the block data source sequence into a plurality of subsequences. Executable code is provided that determines an activity pattern for each of the plurality of subsequences. Executable code is provided that constructs at least one search tree based on the activity pattern of each of the plurality of subsequences. Executable code is provided that performs a search task using the at least one search tree and based on block dependency criteria. Executable code is provided that outputs a dependency mining search result from the search task. Subsets of the plurality of subsequences may be grouped into a plurality of subset groups according to weighting characteristics of the block dependency criteria for each access pattern of the plurality of subsequences. Each of the plurality of subset groups may include access patterns of blocks having a same weight. More than one search tree may be constructed, and the search task may include traversing the more than one search tree. The dependency mining search result may be an aggregated result of traversing the more than one search tree. The access pattern may be an activity vector that identifies occurrences of a particular block in each of the plurality of subsequences. The block dependency criteria may include, for a block (a) and a block (b), the block (b) is depended from block (a) if:

$$d_E(a,b) \leq (1-2p_{threshold}) \cdot \text{weight}(a) + \text{weight}(b)$$

$$\text{weight}(a) \geq m$$

where weight is a number of subsequences where identified block was active, m is a user defined threshold for the minimum number of subsequences where the identified block was active, $p_{threshold}$ is a user defined threshold from 0 to 1, and $d_E$ is a Euclidian distance in computational geometry. The executable code that performs the search task may include executable code that traverses the at least one search tree and pruning branches of the search tree according to a search radius criteria. Executable code may be provided that uses the block dependency mining result in a storage management process.

According further to the system described herein, a storage system includes a storage device that stores data and an analyzer that monitors workload of the storage device. A non-transitory computer readable medium stores software, executable by at least one processor of the analyzer, for performing dependency mining. The software includes executable code that determines a block data source sequence of the data stored on the storage device. Executable code is provided that splits the block data source sequence into a plurality of subsequences. Executable code is provided that determines an activity pattern for each of the plurality of subsequences. Executable code is provided that constructs at least one search tree based on the activity pattern of each of the plurality of subsequences. Executable code is provided that performs a search task using the at least one search tree and based on block dependency criteria. Executable code is provided that outputs a dependency mining search result from the search task. More than one search tree may be constructed, and the search task may include traversing the more than one search tree. The dependency mining search result may be an aggregated result of traversing the more than one search tree. The block dependency criteria may include, for a block (a) and a block (b), the block (b) is depended from block (a) if:

$$d_E(a,b) \leq (1-2p_{threshold}) \cdot \text{weight}(a) + \text{weight}(b)$$

$$\text{weight}(a) \geq m$$

where weight is a number of subsequences where identified block was active, m is a user defined threshold for the minimum number of subsequences where the identified block was active, $p_{threshold}$ is a user defined threshold from 0 to 1, and $d_E$ is a Euclidian distance in computational geometry. Executable code may be provided that uses the block dependency mining result in a storage management process.

BRIEF DESCRIPTION OF THE DRAWINGS

Embodiments of the system are described with reference to the several figures of the drawings, which are briefly described as follows.

FIG. 13 is a flow diagram showing block dependency mining processing according to an embodiment of the system described herein.

DETAILED DESCRIPTION OF VARIOUS EMBODIMENTS

Figure 1:
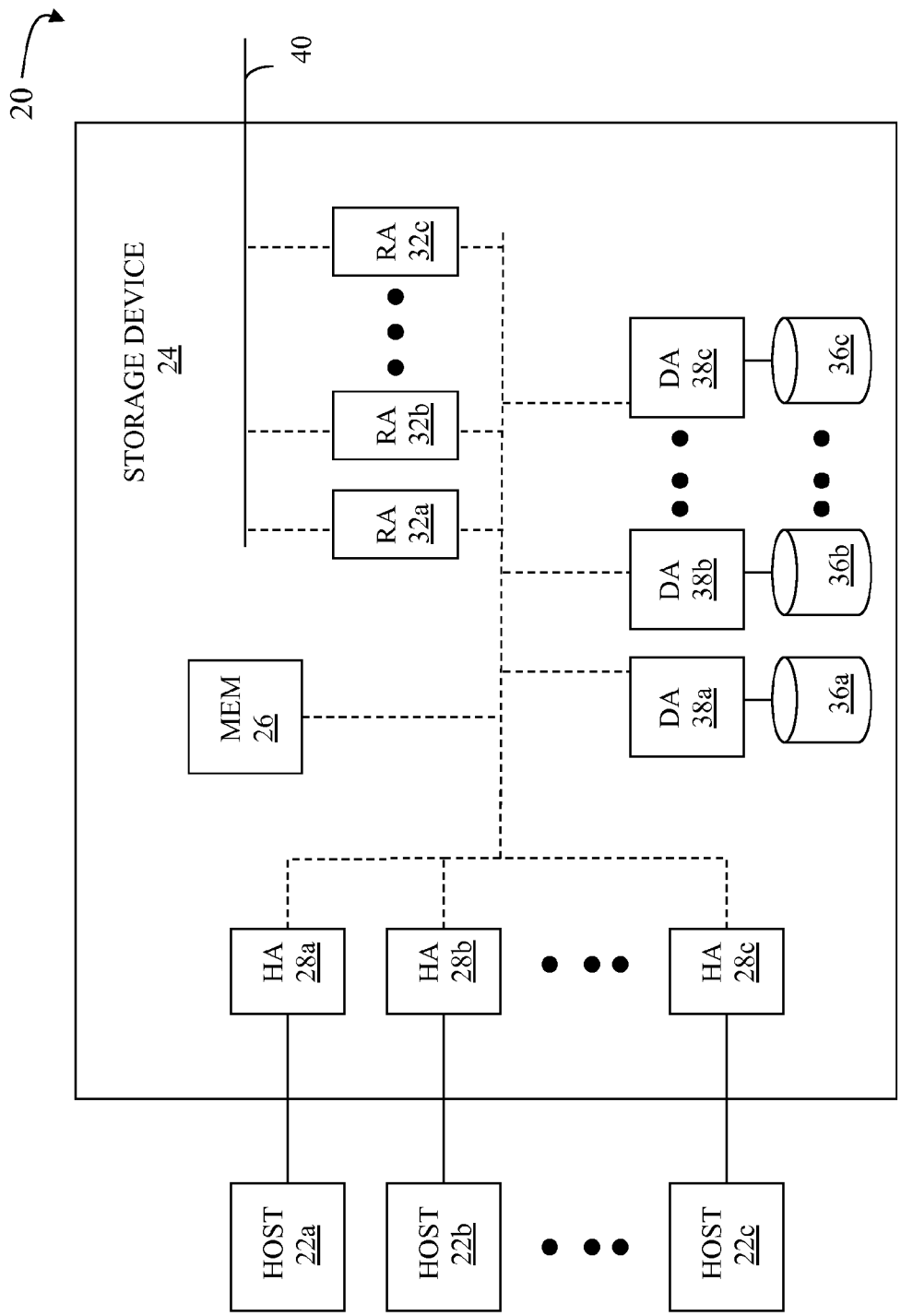
FIG. 1 is a schematic diagram showing a plurality of hosts and a data storage device that may be used in connection with the system described herein.

FIG. 1 is a schematic diagram 20 showing a plurality of hosts 22a-22c coupled to a data storage device 24 that may be used in connection with an embodiment of the system described herein. The data storage device 24 includes a memory 26 that facilitates operation of the storage device 24, as further described elsewhere herein. The data storage device also includes a plurality of host adapters (HA's) 28a-28c that handle reading and writing of data between the hosts 22a-22c and the storage device 24. Although the diagram 20 shows each of the hosts 22a-22c coupled to each of the HA's 28a-28c, it will be appreciated by one of ordinary skill in the art that one or more of the HA's 28a-28c may be coupled to other hosts.

The storage device 24 may include one or more remote adapter units (RA's) 32a-32c that may be used in connection with a Remote Data Facility (RDF) product, such as a Symmetrix® product or other RDF product produced by EMC Corporation of Hopkinton, Mass., and that may be used to copy data from one storage device to another. For example, if a host writes data to a first storage device (e.g., a local storage device), it may be desirable to copy that data to a second storage device provided in a different location (e.g., a remote storage device). The RA's 32a-32c are coupled to a remote link 40 and are similar to the HA's 28a-28c, but are used to transfer data between the storage device 24 and other storage devices (see FIG. 3 and corresponding description) that are also coupled to the link 40. The storage device 24 may be coupled to additional RDF links (not shown) in addition to the link 40. For further discussion of RDF and the use thereof in data recovery and storage techniques, see, for example, U.S. Pat. No. 5,742,792 to Yanai, et al., entitled "Remote Data Mirroring" and U.S. Pat. No. 8,078,813 to LeCrone, et al., entitled "Triangular Asynchronous Replication," which are incorporated herein by reference.

The storage device 24 may also include one or more disks 36a-36c, each containing a different portion of data stored on the storage device 24. Each of the disks 36a-36c may be coupled to a corresponding one of a plurality of disk adapter units (DA) 38a-38c that provides data to a corresponding one of the disks 36a-36c and receives data from a corresponding one of the disks 36a-36c. The disks 36a-36c may include any appropriate storage medium or mechanism, including hard disks, solid-state storage (flash memory), etc. Note that, in some embodiments, it is possible for more than one disk to be serviced by a DA and that it is possible for more than one DA to service a disk. It is noted that the term "data" as used herein may be appropriately understood, in various embodiments, to refer to data files, extents, blocks, chunks and/or other designations that indicate a unit, segment or collection of data.

The logical storage space in the storage device 24 that corresponds to the disks 36a-36c may be subdivided into a plurality of volumes or logical devices. The logical devices may or may not correspond to the physical storage space of the disks 36a-36c. Thus, for example, the disk 36a may contain a plurality of logical devices or, alternatively, a single logical device could span both of the disks 36a, 36b. The hosts 22a-22c may be configured to access any combination of logical devices independent of the location of the logical devices on the disks 36a-36c. A device, such as a logical device described above, has a size or capacity that may be expressed in terms of device geometry. The device geometry may include device geometry parameters regarding the number of cylinders in the device, the number of heads or tracks per cylinder, and the number of blocks per track, and these parameters may be used to identify locations on a disk. Other embodiments may use different structures.

One or more internal logical data path(s) exist between the DA's 38a-38c, the HA's 28a-28c, the RA's 32a-32c, and the memory 26. In some embodiments, one or more internal buses and/or communication modules may be used. In some embodiments, the memory 26 may be used to facilitate data transferred between the DA's 38a-38c, the HA's 28a-28c and the RA's 32a-32c. The memory 26 may contain tasks that are to be performed by one or more of the DA's 38a-38c, the HA's 28a-28c and the RA's 32a-32c and a cache for data fetched from one or more of the disks 36a-36c. Use of the memory 26 is further described elsewhere herein in more detail.

The storage device 24 may be provided as a stand-alone device coupled to the hosts 22a-22c as shown in FIG. 1 or, alternatively, the storage device 24 may be part of a storage area network (SAN) that includes a plurality of other storage devices as well as routers, network connections, etc. The storage device may be coupled to a SAN fabric and/or be part of a SAN fabric. The system described herein may be implemented using software, hardware, and/or a combination of software and hardware where software may be stored in a computer readable storage medium and executed by one or more processors.

Figure 2:
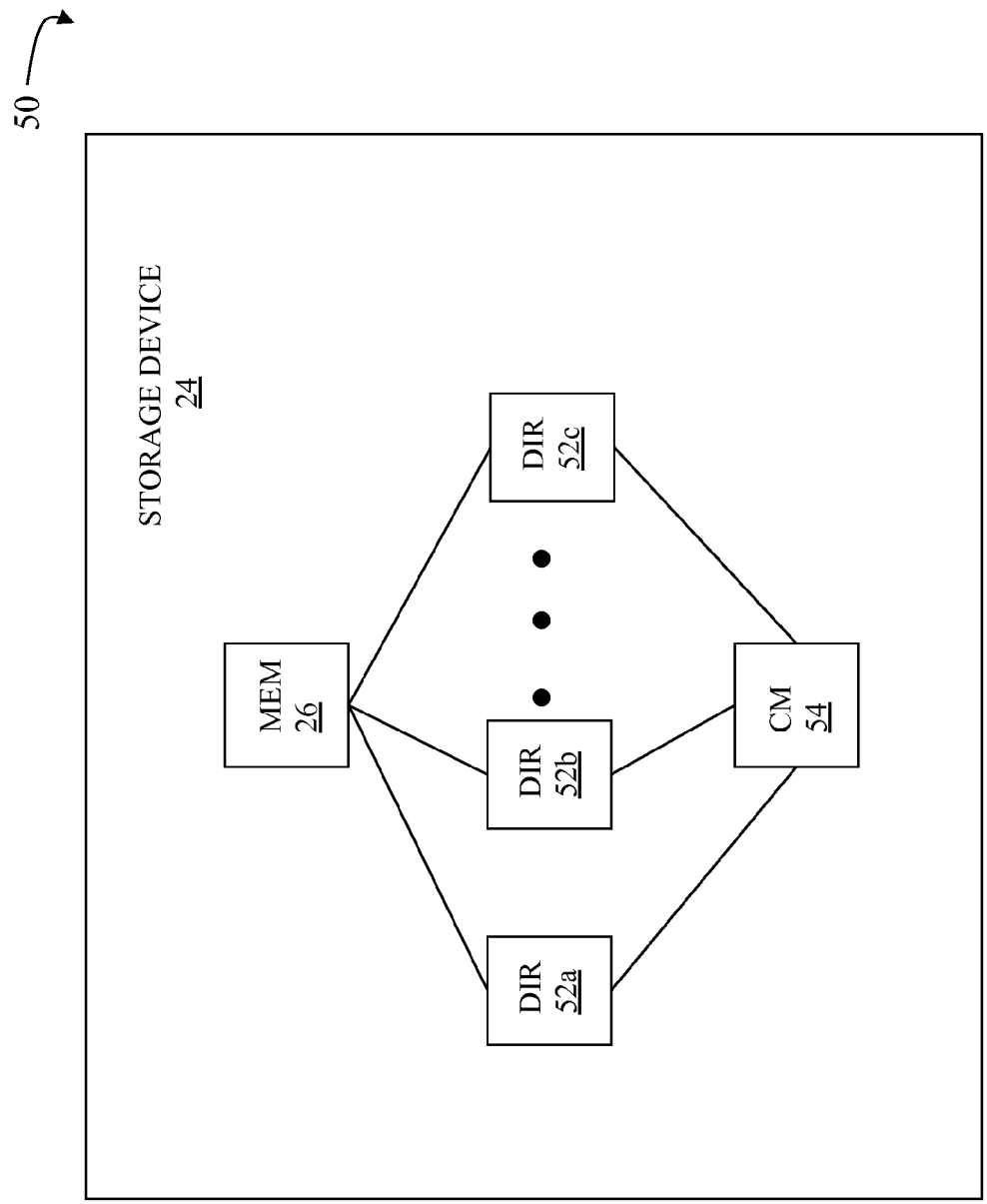
FIG. 2 is a schematic diagram showing a storage device, memory, a plurality of directors, and a communication module that may be used in connection with the system described herein.

FIG. 2 is a schematic diagram 50 illustrating an embodiment of the storage device 24 where each of a plurality of directors 52a-52c are coupled to the memory 26. Each of the directors 52a-52c may represent one of the HA's 28a-28c, RA's 32a-32c, and/or DA's 38a-38c. In an embodiment disclosed herein, there may be up to sixty four directors coupled to the memory 26. Of course, for other embodiments, there may be a higher or lower maximum number of directors that may be used.

The diagram 50 also shows an optional communication module (CM) 54 that provides an alternative communication path between the directors 52a-52c. Each of the directors 52a-52c may be coupled to the CM 54 so that any one of the directors 52a-52c may send a message and/or data to any other one of the directors 52a-52c without needing to go through the memory 26. The CM 54 may be implemented using conventional MUX/router technology where a sending one of the directors 52a-52c provides an appropriate address to cause a message and/or data to be received by an intended receiving one of the directors 52a-52c. Some or all of the functionality of the CM 54 may be implemented using one or more of the directors 52a-52c so that, for example, the directors 52a-52c may be interconnected directly with the interconnection functionality being provided on each of the directors 52a-52c. In addition, a sending one of the directors 52a-52c may be able to broadcast a message to all of the other directors 52a-52c at the same time.

In some embodiments, one or more of the directors 52a-52c may have multiple processor systems thereon and thus may be able to perform functions for multiple directors. In some instances, at least one of the directors 52a-52c having multiple processor systems thereon may simultaneously perform the functions of at least two different types of directors (e.g., an HA and a DA). Furthermore, in some embodiments, at least one of the directors 52a-52c having multiple processor systems thereon may simultaneously perform the functions of at least one type of director and perform other processing with the other processing system. In addition, the memory 26 may be a global memory in which all or at least part of the global memory may be provided on one or more of the directors 52a-52c and shared with other ones of the directors 52a-52c. The memory 26 may be part of a global memory distributed across the processor systems of more than one storage device and accessible by each of the storage devices.

Note that, although specific storage device configurations are disclosed in connection with FIGS. 1 and 2, it should be understood that the system described herein may be implemented on any appropriate platform. Thus, the system described herein may be implemented using a platform like that described in connection with FIGS. 1 and 2 or may be implemented using a platform that is somewhat or even completely different from any particular platform described herein.

Figure 3:
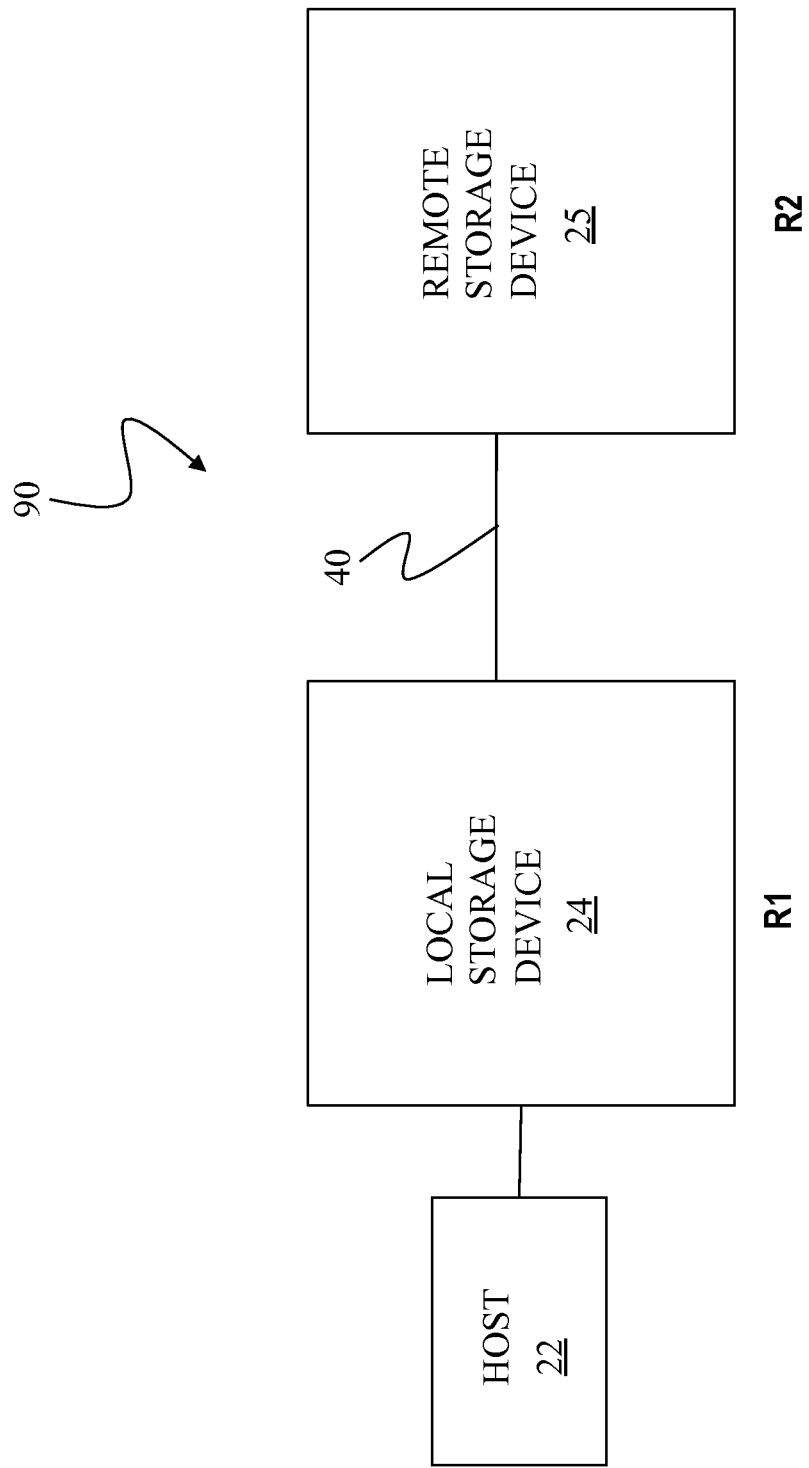
FIG. 3 is a schematic diagram showing a storage system including the storage device, as a local storage device, coupled to a remote storage device via an RDF link that may be used in connection with an embodiment of the system described herein.

FIG. 3 is a schematic diagram showing a storage system 90 including the storage device 24, as a local storage device, coupled to a remote storage device 25 via the remote link 40 that may be used in connection with operation of the system described herein. The remote storage device 25 may be the same type of storage device as the storage device 24, and have similar components as described with respect to the storage device 24, and/or may be a different type of storage device. The local storage device 24 and the remote storage device 25 may operate as an RDF product for providing backup and/or mirrored copies of data, as further discussed elsewhere herein. The RDF functionality described herein may be applied so that the data for at least a portion of the disks 36a-36c of the local storage device 24 is copied, using RDF, to at least a portion of similar disks of the remote storage device 25. It is possible that other data of the storage devices 24, 25 is not copied between the storage devices 24, 25 and, thus, the data stored on the storage devices 24, 25 may not be identical.

Providing an RDF mapping between portions of the local storage device 24 and the remote storage device 25 involves setting up a logical device on the remote storage device 25 that is a remote mirror for a logical device on the local storage device 24. One or more of the hosts 22a-22c, illustrated as a host 22, may read and write data from and to the logical device on the local storage device 24 and the RDF mapping causes modified data to be transferred from the local storage device 24 to the remote storage device 25 using the RA's 32a-32c and similar RA's on the remote storage device 25 that are connected via the link 40. In steady state operation, the logical device on the remote storage device 25 may contain data that is a copy of, or at least substantially identical to, the data of the logical device on the local storage device 24. The logical device on the local storage device 24 that is accessed by the host 22 may be referred to as the "R1 volume" (or just "R1") while the logical device on the remote storage device 25 that contains a copy of the data on the R1 volume is called the "R2 volume" (or just "R2"). Thus, the host 22 reads and writes data from and to the R1 volume and RDF handles automatic copying and updating of the data from the R1 volume to the R2 volume and/or from the R2 volume to the R1 volume in accordance with the system described herein.

Figure 4:
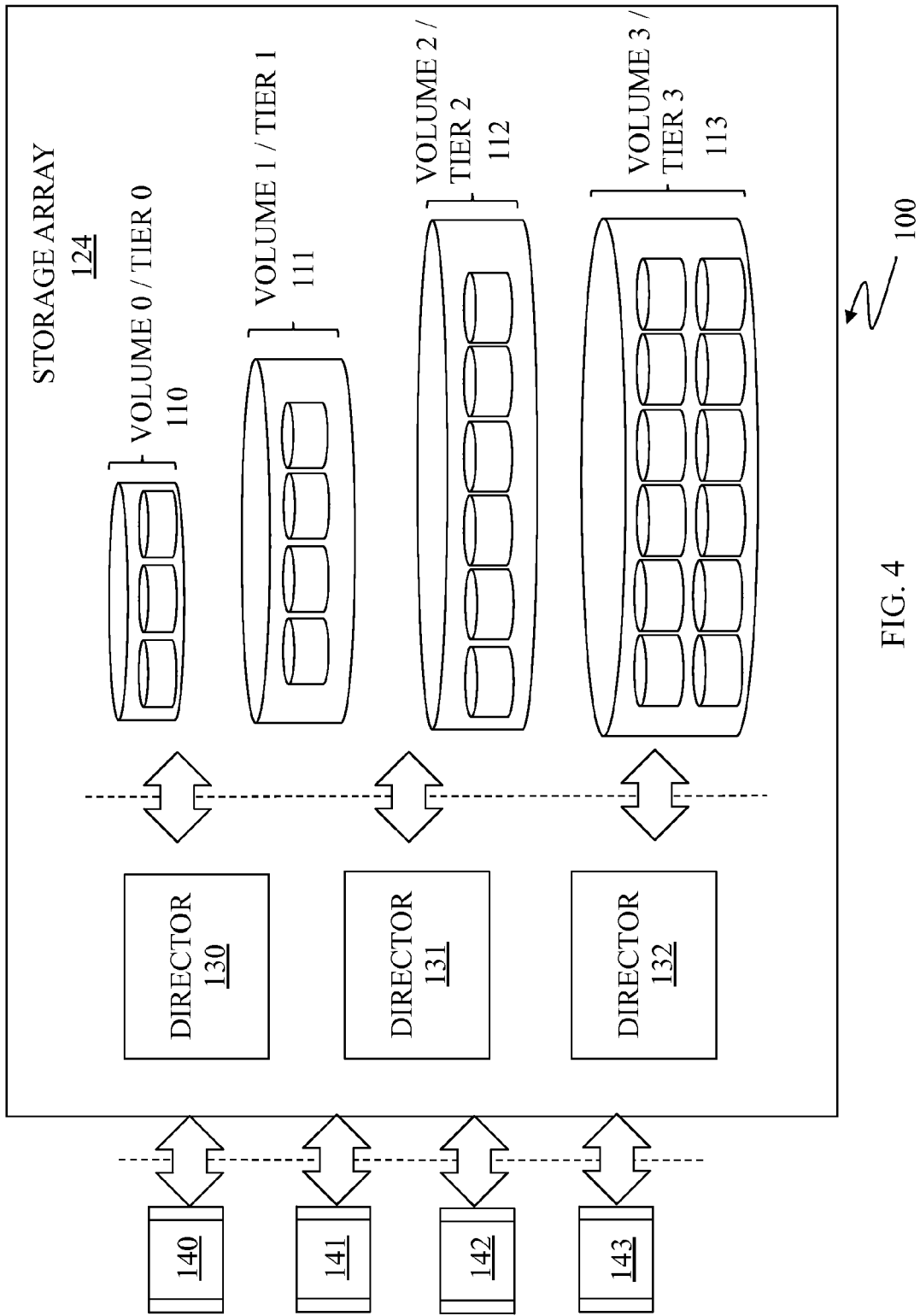
FIG. 4 is a schematic illustration showing a storage array according to an embodiment of the system described herein.

FIG. 4 is a schematic illustration showing a storage system 100 that may be used in connection with an embodiment of the system described herein. The storage system 100 may include a storage array 124 having multiple directors 130-132 and multiple storage volumes (VOLUMES 0-3) 110-113. Host applications 140-144 and/or other entities (e.g., other storage devices, SAN switches, etc.) request data writes and data reads to and from the storage array 124 that are facilitated using one or more of the directors 130-132. The storage array 124 may include similar features as that discussed in connection with the storage device 24 of FIGS. 1-3 with appropriate modifications made in accordance with the functionality discussed elsewhere herein.

The volumes 110-113 may be provided in multiple storage tiers (TIERS 0-3) that may have different storage characteristics, such as speed, cost, reliability, availability, security and/or other characteristics. Generally, a tier may represent a set of storage resources residing in a storage platform and may also be referred to herein as a storage type. Examples of storage disks that may be used as storage resources within a storage array of a tier may include sets of Serial Advanced Technology Attachment (SATA) disks, Fibre Channel (FC) disks and/or Enterprise Flash Disk (EFD) disks, among other known types of storage disks. Techniques involving the management of data between volumes on multiple storage tiers and/or between multiple storage tiers within a single volume are described, for example in U.S. Ser. No. 12/586,837 to LeCrone et al., filed Sep. 29, 2009, entitled "Sub-Tiering Data At The Volume Level," and U.S. Ser. No. 12/592,988 to Martin et al., filed Dec. 7, 2009, entitled "Normalizing Capacity Utilization Within Virtual Storage Pools", which are incorporated herein by reference.

According to various embodiments, each of the volumes 110-113 may be located in different storage tiers. Tiered storage provides that data may be initially allocated to a particular fast volume/tier, but a portion of the data that has not been used over a period of time (for example, three weeks) may be automatically moved to a slower (and perhaps less expensive) tier. For example, data that is expected to be used frequently, for example database indices, may be initially written directly to fast storage whereas data that is not expected to be accessed frequently, for example backup or archived data, may be initially written to slower storage. In an embodiment, the system described herein may be used in connection with a Fully Automated Storage Tiering (FAST) product produced by EMC Corporation of Hopkinton, Mass., that provides for the optimization of the use of different storage tiers including the ability to easily create and apply tiering policies to transparently automate the control, placement, and movement of data within a storage system based on business needs.

Figure 5A:
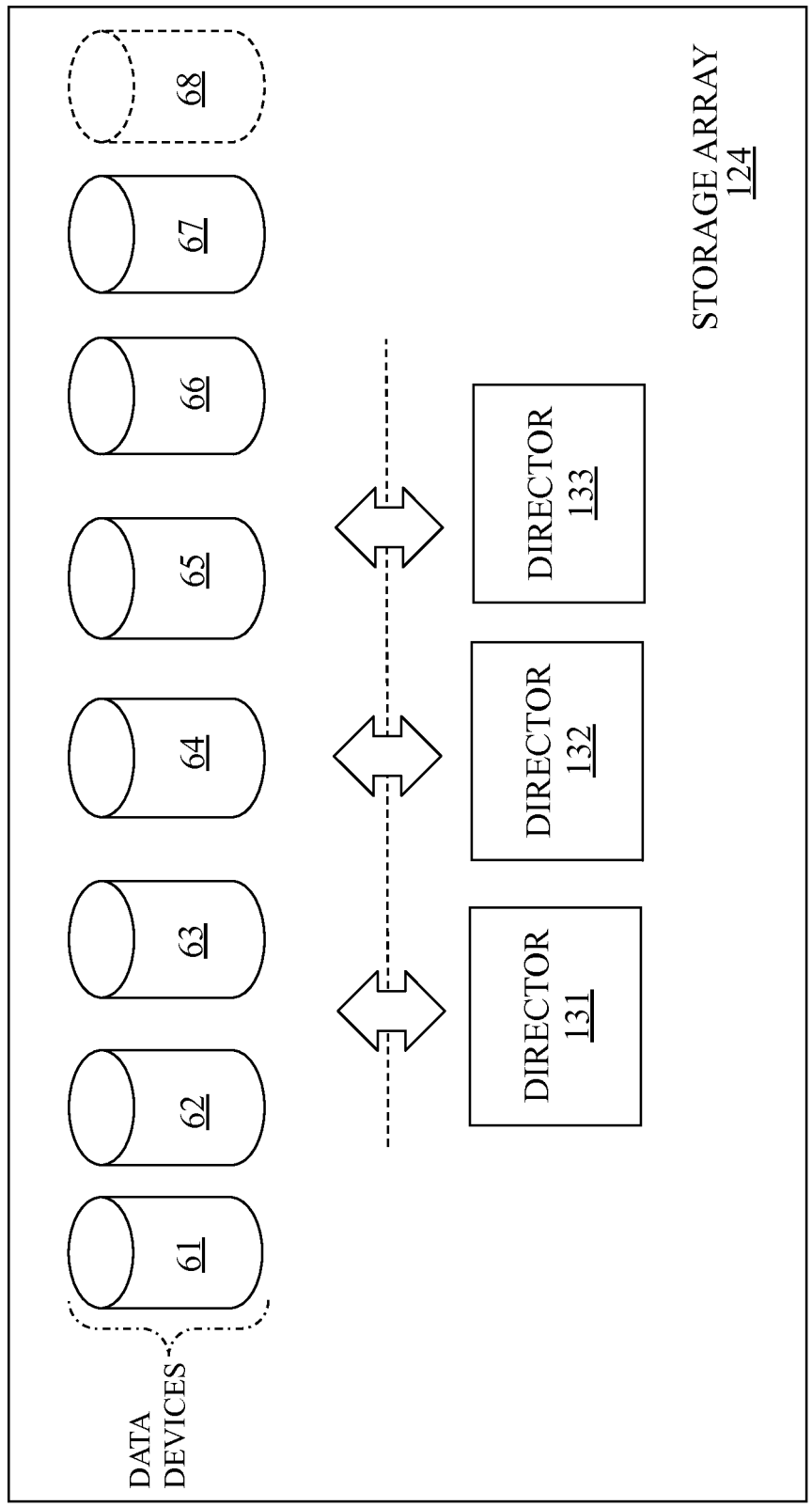
FIGS. 5A and 5B are schematic diagrams showing the storage array as including one or more data devices according to an embodiment of the system described herein.

FIG. 5A is a schematic diagram showing the storage array 124 as including a plurality of data devices 61-68 communicating with directors 131-133. The data devices 61-68 may be implemented as logical devices like standard logical devices provided in a Symmetrix® data storage device produced by EMC Corporation of Hopkinton, Mass., for example. The data device 68 is illustrated with broken lines to indicate that the data device 68 does not yet exist but may be created, as further discussed elsewhere herein. In some embodiments, the data devices 61-67 may not be directly useable (visible) to hosts coupled to the storage array 124. Each of the data devices 61-67 may correspond to a portion (including a whole portion) of one or more of the disk drives 42-44. Thus, for example, the data device section 61 may correspond to the disk drive 42, may correspond to a portion of the disk drive 42, or may correspond to a portion of the disk drive 42 and a portion of the disk drive 43. The data devices 61-67 may be designated as corresponding to different classes, so that different ones of the data devices 61-67 correspond to different physical storage having different relative access speeds or RAID protection type (or some other relevant distinguishing characteristic or combination of characteristics), as further discussed elsewhere herein. Alternatively, in other embodiments that may be used in connection with the system described herein, instead of being separate devices, the data devices 61-68 may be sections of one data device.

Figure 5B:
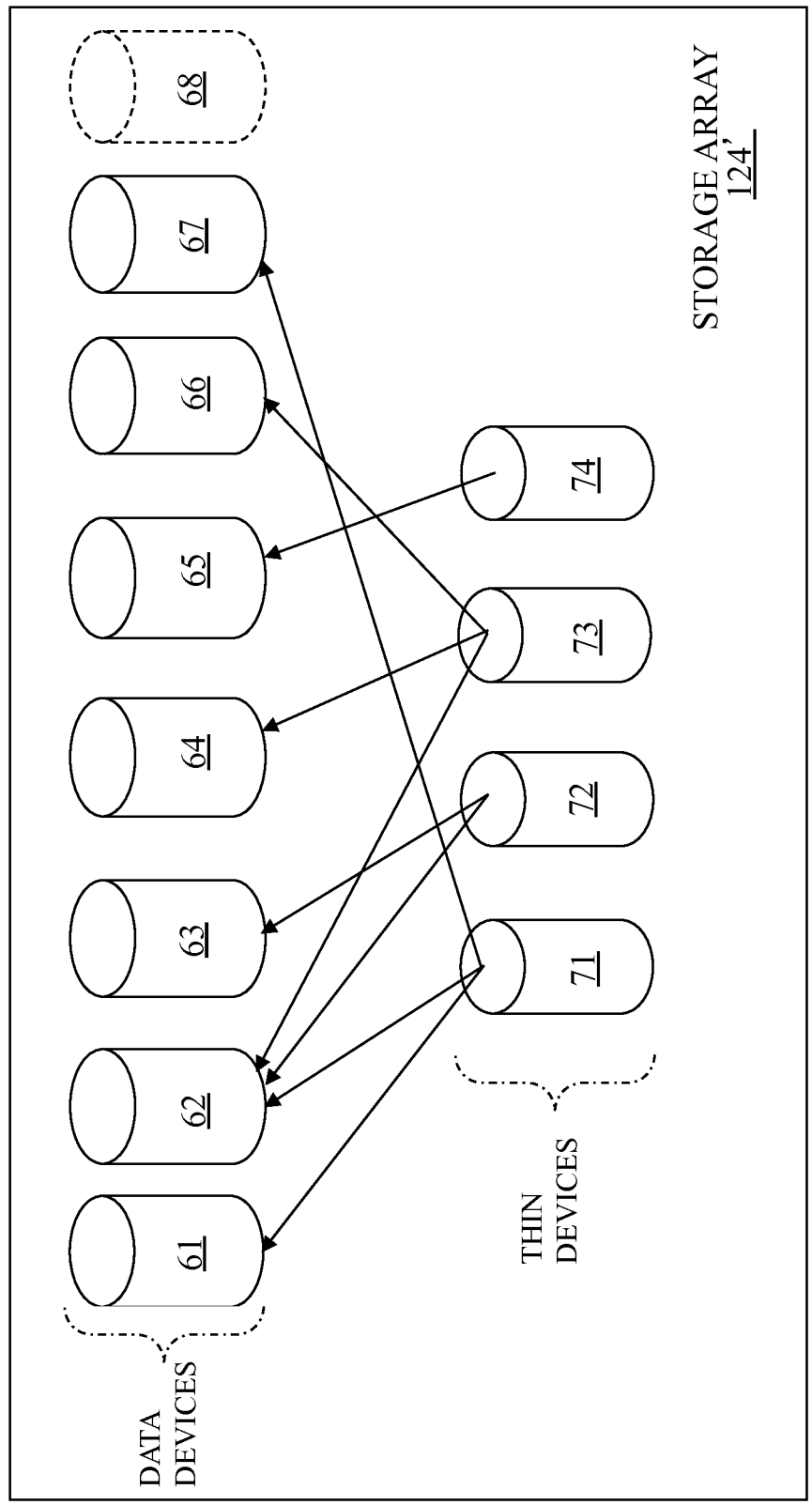

Optionally, as shown in FIG. 5B, a storage array 124', with some similar elements as the storage array 124, may also include a plurality of thin devices 71-74 that may be adapted for use in connection with the system described herein when using thin provisioning. With thin provisioning, the allocation of the physical storage space for a thin device at the time of writing the data, as well as the policies that govern the allocation, may be transparent to a user. For example, a user's inquiry into how much storage space is available on a particular thin device may indicate a maximum amount of physical storage space that could be allocated for a thin storage device even though the corresponding physical storage space had not yet been allocated. In an alternative embodiment, the policy for the thin device may be to report something less than the total maximum that could be allocated.

For a general discussion of thin provisioning techniques, see, for example, U.S. Patent App. Pub. No. 2009/0070541 A1 to Yochai et al., entitled "Automated Information Life-Cycle Management With Thin Provisioning," U.S. Pat. No. 7,822,939 to Veprinsky et al., entitled "Data De-duplication Using Thin Provisioning," and U.S. Pat. No. 7,949,637 to Burke, entitled "Storage Management for Fine Grained Tiered Storage with Thin Provisioning," which are all incorporated herein by reference. In a system using thin provisioning, the thin devices 71-74 may appear to a host coupled to the storage array 124' as one or more logical volumes (logical devices) containing contiguous blocks of data storage. Each of the thin devices 71-74 may contain pointers to some or all of the data devices 61-67 (or portions thereof).

Figure 6:
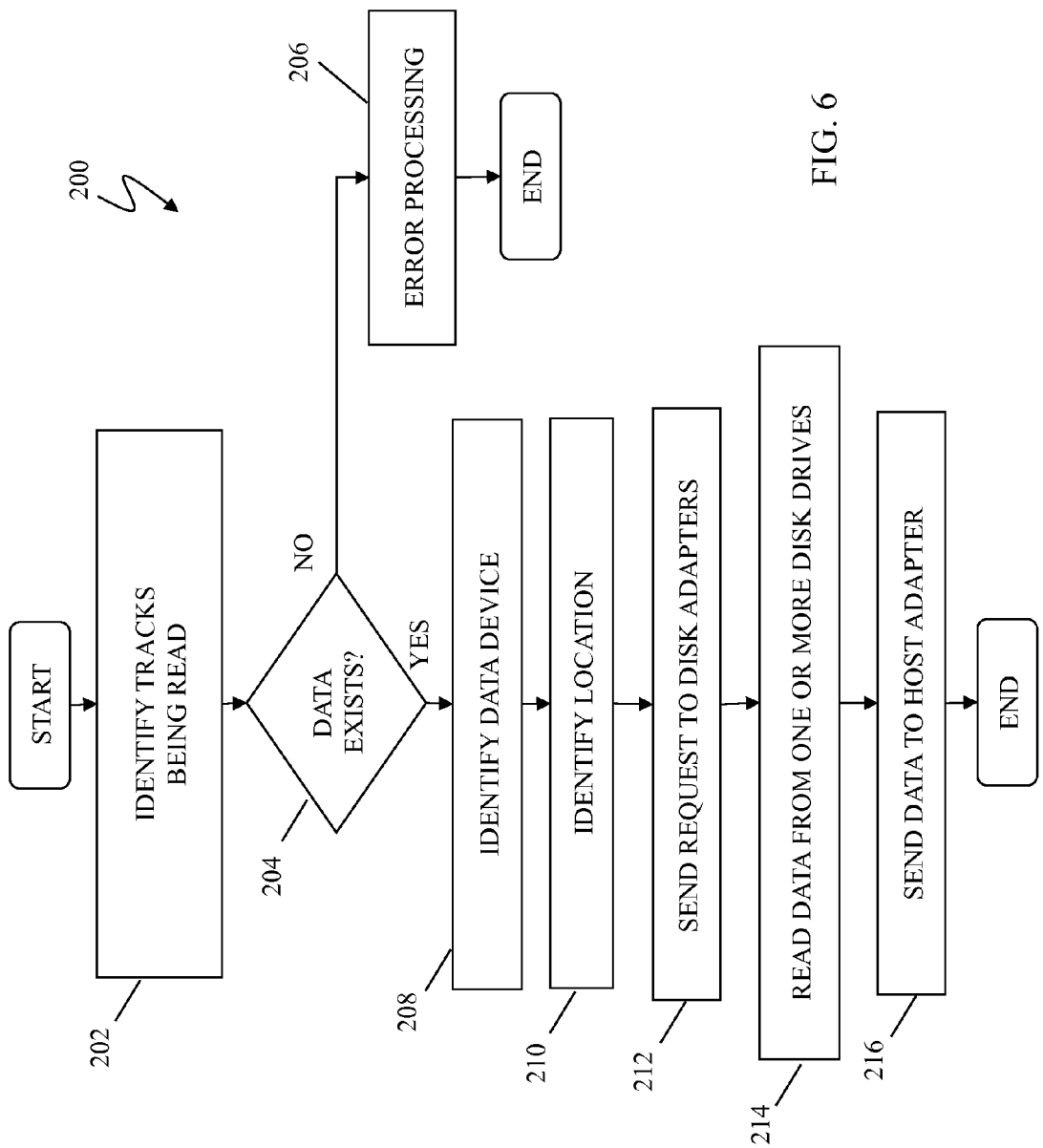
FIG. 6 is a flow diagram illustrating processing for handling a read of one or more logical tracks of one of the devices according to an embodiment of the system described herein.

FIG. 6 is a flow diagram 200 illustrating processing for handling a read of one or more logical tracks of one of the devices 61-67 in accordance with an embodiment of the system described herein. In a step 202, an appropriate one of the host adapters 28a-28c reads identifies the logical tracks being read. In various embodiment, the logical tracks may be identified using information stored on one or more of the data devices 61-67 and/or the tracks may be identified using one or more of the thin devices 71-74. After the step 202, at a test step 204, it is determined whether the identified logical tracks correspond to any of the data devices 61-67 (i.e., if there is physical data corresponding to the logical tracks being read). If there is no corresponding physical data (meaning that no logical track(s) were ever written), then processing proceeds to a step 206 where error processing is performed, such as returning a NULL value to the host. Other appropriate error processing may be performed at the step 206. After the step 206, processing is complete.

If it is determined at the step 204 that there is physical data corresponding to the logical tracks being read, then processing proceeds to a step 208 where one or more of the data devices 61-67 associated with the logical tracks being read are identified. After the step 208, processing proceeds to a step 210 where information, such as a track table, is read from the identified one or more of the data devices 61-67 and the corresponding location of the physical data (i.e., cylinder and track) is determined. Logical storage space maps to physical storage space of the physical devices. After the step 310, processing proceeds to a step 212 where a request may be sent to one or more disk adapters 38a-38c corresponding to disk drives 36a-36c that provide the physical storage space associated with the identified one of the data devices 61-67 and corresponding location information. After the step 212, processing proceeds to a step 214 where the physical data is read. Note that the data may be stored in a cache or other memory (for example, the memory 26) in connection with being read. In some cases, if the data being read is already in the cache, then the processing at the step 212 and following steps may not be necessary. Note also that reading the data may include updating any metadata used to provide the processing described herein, such as the time last accessed, the host/user making the request, frequency of use, and/or any other appropriate metric. After the step 214, processing proceeds to a step 216 where the data may be received by an appropriate one of the host adapters 28a-28c (e.g., by reading the memory 26). After the step 216, processing is complete.

Figure 7:
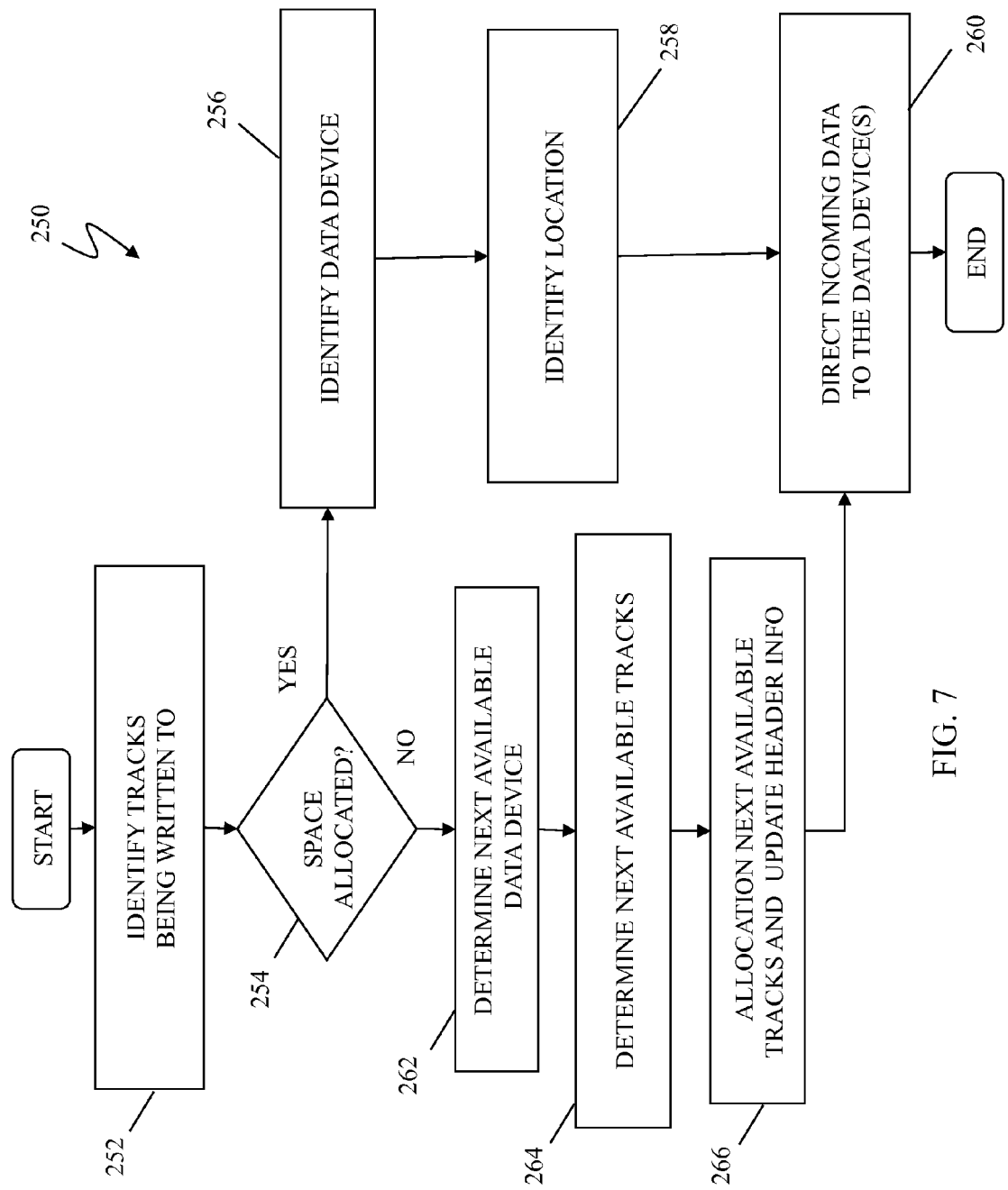
FIG. 7 is a flow diagram illustrating processing for handling a write of logical tracks to one or more of the devices in connection with the system described herein.

FIG. 7 is a flow diagram 250 illustrating processing for handling a write of logical track(s) to one or more of the device(s) 61-67 in connection with an embodiment of the system described herein. At a step 252, an appropriate one of the host adapters 28a-28c identifies logical tracks being written. In various embodiment, the logical tracks may be identified using information stored on one or more of the data devices 61-67 and/or the tracks may be identified using one or more of the thin devices 71-74. Following the step 252 is a test step 254 where it is determined whether physical space had been previously allocated (i.e., in a prior write operation) for the tracks being written. If so, then processing proceeds to a step 256 where the data device that includes the tracks is identified. After the step 256, is a step 258 where information, such as a track table, is read from the identified one or more of the data devices 61-67 and the corresponding location of the physical data (i.e., cylinder and track) is determined. As further discussed elsewhere herein, physical storage space may be provided in connection with one data device including a concatenation of multiple data device portions. Storage space of the physical devices maps to logical storage space of the data devices. Following the step 258 processing proceeds to a step 260 where the data being written is directed to the appropriate physical storage space. As further discussed elsewhere herein, data may be written among multiple devices in a striping process in which data is advantageously striped across the multiple devices. After the step 260, processing is complete.

If it is determined at the step 254 that there is no physical storage that has been allocated for the logical track(s) being written, then control transfers to a step 262, where a next available data device identifier (i.e., the data device 68) is determined. After the step 262, processing proceeds to a step 264 where available physical storage space on the disk drives 36a-36c is determined. In an embodiment herein, available physical storage space is allocated sequentially from one or more of the disk drives 36a-36c. Following the step 264 is a step 266 where a request may be sent to a disk adapter 38a-38c (or possibly the RA's 32a-32c) to allocate the physical storage space for the write. Also at the step 266, header info is updated to reflect the newly allocated data device and physical tracks. After the step 266, processing proceeds to the step 260, discussed above, where the data being written is directed to the one or more data device sections. After the step 260, processing is complete.

After the above-described read and write processes, information concerning access of the data, such as access frequency, time of last access or use and/or other characteristics and statistics, may be updated and stored by the system described herein. The updated data access information or other characteristic information of the data and/or any portion of the data may, for example, may be stored in a memory, such as the global memory 26 of the storage device 24. As further discussed elsewhere herein, the data access information may be stored in a manner accessible by an analyzer in connection with determining access patterns for dependency mining according to the system described herein. Other implementations for storing and access of the data characteristic information are possible.

As discussed elsewhere herein, the data devices 61-68 may be associated with physical storage areas (e.g., disk drives, tape, solid state storage, etc.) having different characteristics. In various embodiments, the physical storage areas may include multiple sub-tiers of storage in which each sub-tier of storage areas and/or disk drives that may be ordered according to different characteristics and/or classes, such as speed, technology and/or cost. The devices 61-67 may appear to a host coupled to the storage device 24 as a logical volume (logical device) containing a contiguous block of data storage, as discussed herein. Accordingly, each of the devices 61-67 may map to storage areas across multiple storage volumes. The granularity at which the storage system described herein operates may be smaller than at the file level, for example potentially as small as a single byte, but more practically at the granularity of a single logical block or collection of sequential data blocks. A data block may be of any size including file system or database logical block size, physical block, track or cylinder and/or other size. Multiple data blocks may be substantially the same size or different sizes, such as different size data blocks for different storage volumes or different sized data blocks within a single storage volume. It is also noted that, in other embodiments, the data device 60 may be a metavolume of concatenated volumes/devices, as further discussed elsewhere herein.

Figure 8:
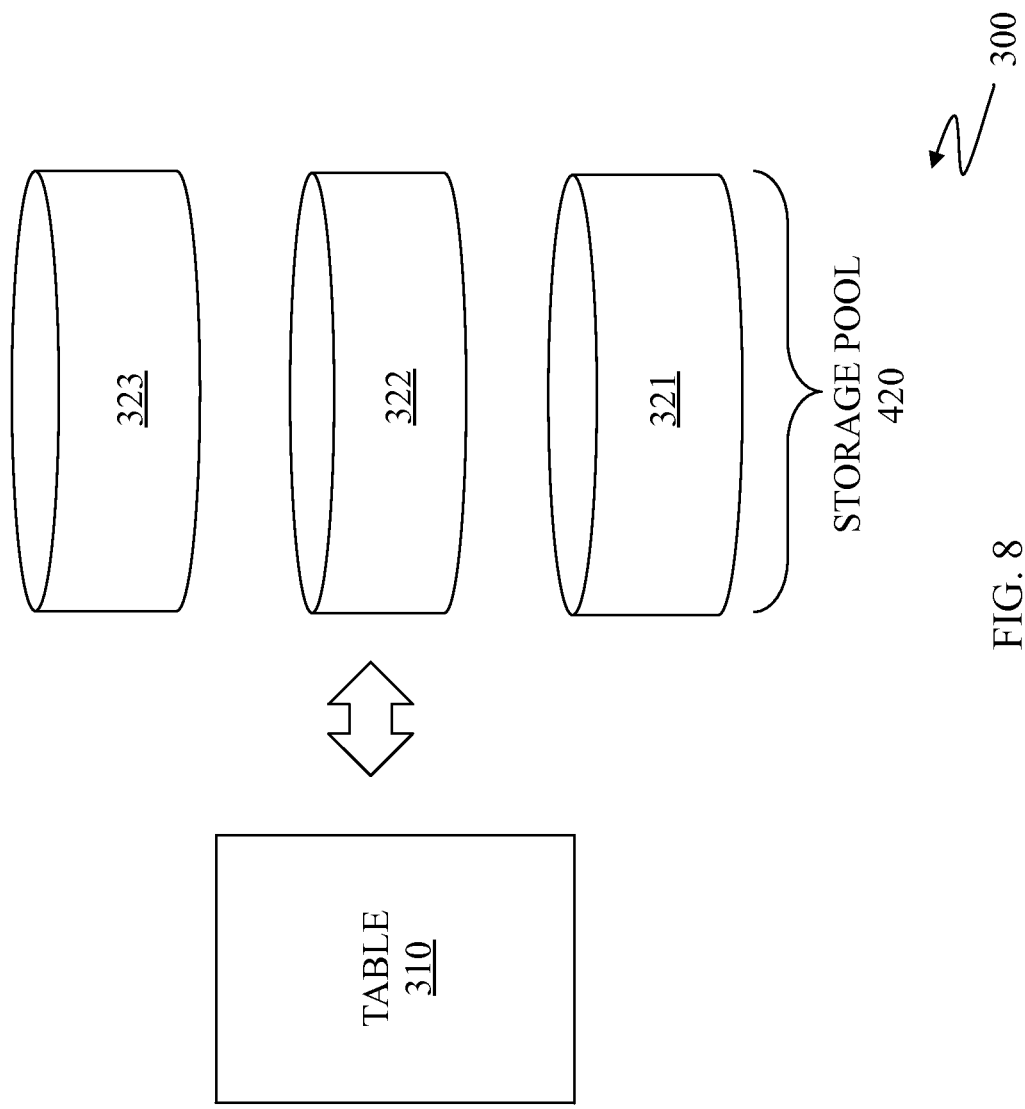
FIG. 8 is a schematic illustration of a storage array that may be used in connection with an embodiment of the system described herein.

FIG. 8 is a schematic illustration of a storage array 300 used in connection with an embodiment of the system described herein. A table 310 may map data stored in multiple logical devices to multiple storage volumes 321-323 forming a storage pool 320. As discussed elsewhere herein, each of the volumes 321-323 may include one or more data devices, like the data devices 61-68 discussed elsewhere herein, that map to physical storage areas. The volumes 321-323 may be part of one or more storage devices like that further discussed elsewhere herein. It is noted that in various embodiments the table 310 may be stored in a global memory of the storage array, stored in connection with one or more of the thin devices 71-74 and/or stored in a memory of a separate device, among other appropriate storage locations of the table 310.

Figure 9:
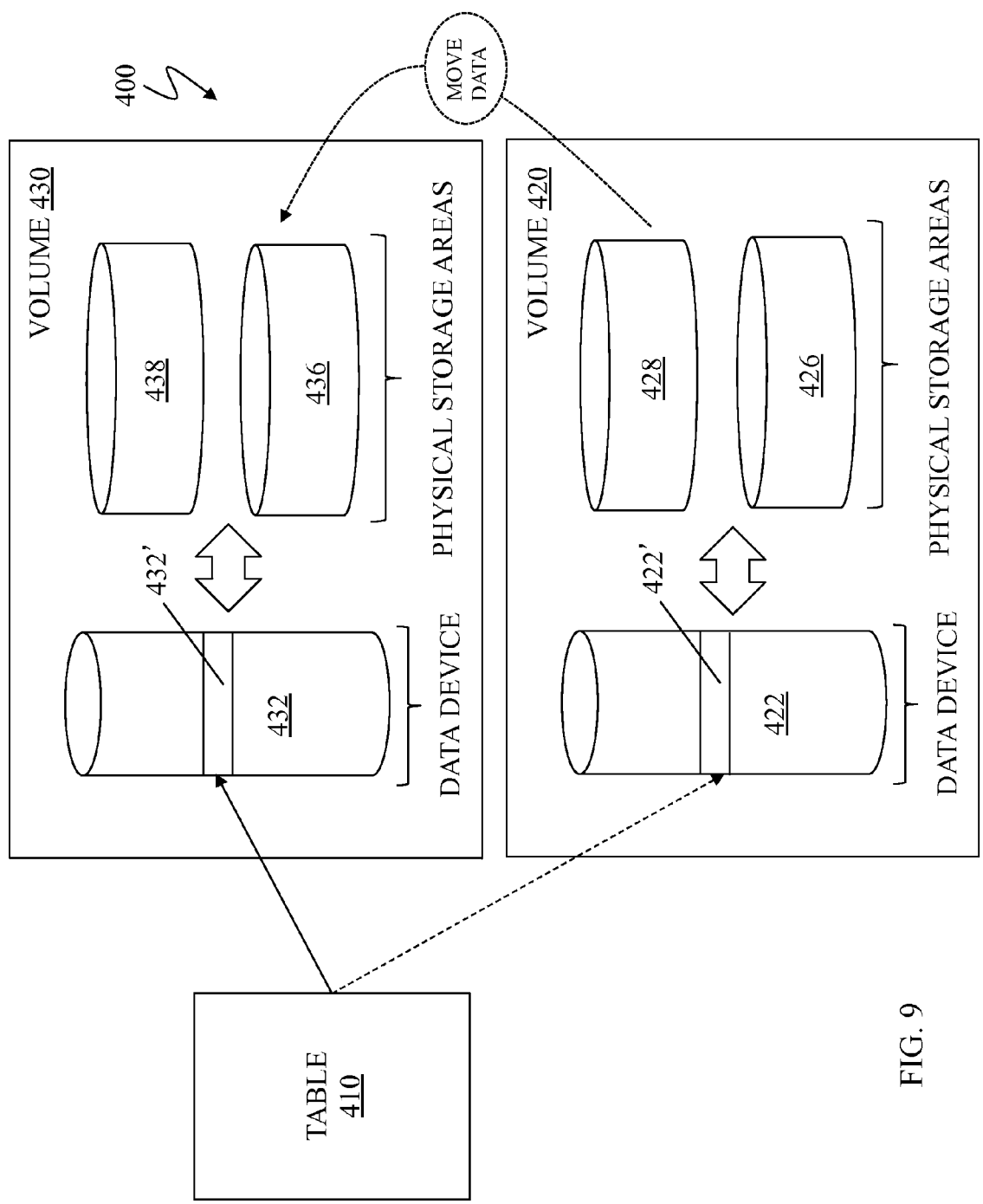
FIG. 9 is a schematic illustration showing a storage device in connection with movement of data in a process that may be used in connection with an embodiment of the system described herein.

FIG. 9 is a schematic illustration showing an embodiment of a storage array 400 described in connection with movement of data from one storage area to a different storage area according to an embodiment of the system described herein. The storage system 400 may include a table 410 and one or more volumes 420, 430. The volumes 420, 430 may have the same or different characteristics. In an embodiment, one of the volumes may represent a cache memory and data may be moved from the other volume to the cache memory for efficient access to the data. In an embodiment, each of the volumes 420, 430 may include a data device 422, 432 associated with respective physical storage areas 426, 428, 436, 438. Note that, in various embodiments, the table 410 may be incorporated into memories one or more of the volumes 420, 430 and/or be stored in a device that is separate therefrom, among other appropriate storage locations of the table 410. In connection with moving data from the volume 420 to the volume 430, the table 410 may be modified to point to map to the new location of the data on the physical storage areas 436, 438 of the volume 430. In an embodiment, access information concerning the movement of the data may be stored and used in connection with determining access patterns for dependency mining according to the system described herein.

According to the system described herein, access patterns of data blocks may be used to predict future accesses to the data blocks. One of the types of patterns that may be used in connection with the system described herein is depended blocks. Dependent blocks are blocks that are often referenced one after another in a short period of time. For example, one block (block b) is commonly referenced after another block (block a) during one second (or other noted time period). The system described herein provides a block dependency algorithm that enables searching of block dependencies with respect to proposed definitions.

Figure 10:
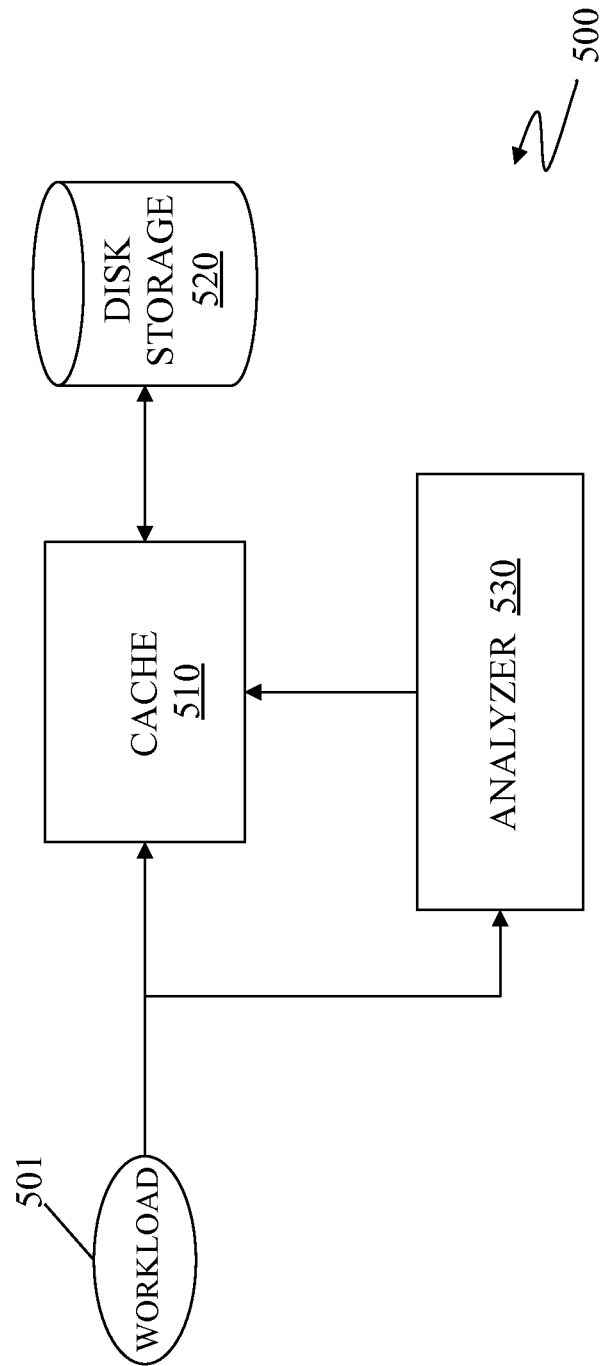
FIG. 10 is a schematic illustration showing an storage system having a dependency mining analyzer according to an embodiment of the system described herein.

FIG. 10 is a schematic illustration showing an storage system 500 having a dependency mining analyzer 530 according to an embodiment of the system described herein. A cache memory 510 is shown that is coupled to another storage device, such as a disk storage device 520. The analyzer 530 may detect and observe workload of I/O to and from the cache memory 510. As a result, the analyzer 530 may detect dependent blocks by observing or measuring access statistics of the workload. It is noted that the access statistics used according to the system described herein may be gathered by an application or tool of the analyzer 530 itself, for example, in connection with operation using a controller providing storage management functionality, such as ProSphere® product produced by EMC Corporation and/or may be obtained from other sources, such as, for example, data obtained from the EMC Workload Analyzer (WLA), the Symmetrix Performance Analyzer (SPA)® and/or the Symmetrix® CLI statistics collection daemon (STP), among other possible collection devices, applications and/or tools. Reference is made, for example, to U.S. Pat. No. 6,622,221 to Zahavi, entitled "Workload Analyzer and Optimizer Integration," which is assigned to EMC Corporation and is incorporated herein by reference and which discloses techniques used in connection with evaluating the performance of proposed device swap plans in accordance with past performance data collected.

It is also noted that front end accesses may be distinguished from back end accesses of the storage array in connection with the system described herein. That is, operation of the system described herein may be based principally on the actual disk drive accesses at the storage array back end rather than accesses at the front end as seen by the requesting host/application. This is because data initially accessed at the back end, i.e. from the disk drives, may then be stored in a cache, that has a fast access speed, in connection with servicing a host's request at the front end of the storage array. The cache may not be emptied immediately such that recently-accessed data may stay in the cache for future access operations by the host without causing subsequent access operations at the back end of the storage array with the actual disk drives. Use of the cache in this manner would affect determinations of number of I/O operations, since, for example, data that is accessed frequently from the cache might appear as if it is not accessed frequently from the back end of the system, e.g., the data was accessed once at the beginning of the day from the disk drives and thereafter accessed by the host from the cache.

As further discussed elsewhere herein, various techniques, such as c-miner, are known for determining dependency of blocks. Such dependencies may then be used in connection with a frequent sequence search of blocks. Generally, for n unique blocks the complexity (big O analysis) for a frequent sequence search algorithm according to known techniques is $O(n^\delta)$, where $\delta$ is the length of the window in the reference stream where search is performed. It is also noted that the size of the stored data structure for the search may, in some cases, exceed the sequence length.

According to an embodiment of the system described herein, a data block dependency approach is provided in which a source sequence of blocks is split into subsequences of equal length $\delta$. For example, for $\delta=5$:
source sequence: abceabfhcabcheahhhhhfcafe
is split into: (abcea) (bfhca) (bchea) (hhhhh) (fcafe).

Each unique block (e.g., a, b, c, e, f, h) is assigned an activity vector which represents an access pattern of the block. A length of the vector is equal to the number of subsequences of length $\delta$. Let a number of references in the source sequence be N. Then, each vector has length $N/\delta$. Each value in the vector value is:

"1" if there is any reference to the block in a subsequence corresponded to this position;

"0" if there is no reference to the block in the subsequence corresponded to this position.

From the example sequence above, the blocks are a, b, c, d, e, f, h and the activity vectors for each of these blocks are:
a—(1, 1, 1, 0, 1)
b—(1, 1, 1, 0, 0)
c—(1, 1, 1, 0, 1)
e—(1, 0, 1, 0, 1)
f—(0, 1, 0, 0, 1)
h—(0, 1, 1, 1, 0).

A dependency definition is defined. In an embodiment of the system described herein, the dependency definition may be:

Definition 1: Block (b) is depended from block (a) if:

$$\text{weight}(a) \geq m$$

$$\text{confidence}(b|a) = \text{weight}(a \cdot b)/\text{weight}(a) \geq p_{threshold},$$

where weight is the number of subsequences where block was active, $a \cdot b$ is a scalar product, m is a user defined threshold for the minimum number of subsequences where block was active, and $p_{threshold}$ is a user defined threshold from 0 to 1. For a search task to find all pairs of blocks that are satisfied to the above-noted definition, the complexity of the above-noted "naïve" method is $O(n^2)$, where n is the number of unique blocks in a sequence.

According to another embodiment of the system described herein, the above-noted block dependency approach may be sped up by reformulating the above-noted definition:

Definition 2: Block (b) is dependent from block (a) if:

$$d_E(a,b) \leq (1-2p_{threshold}) \cdot weight(a) + weight(b)$$

$$weight(a) \geq m$$

where $d_E$ is the Euclidian distance in computational geometry.

Based on the above definition, the search task may be reformulated into: by given query activity vector q, retrieve all activity vectors that are within distance r (search radius) of q.

In an embodiment, the above-noted search task may be performed based on using of a branch and bound methodology. First, a search tree is built in and then a search algorithm is used to traverse and "prune" the branches of the tree.

Figure 11:
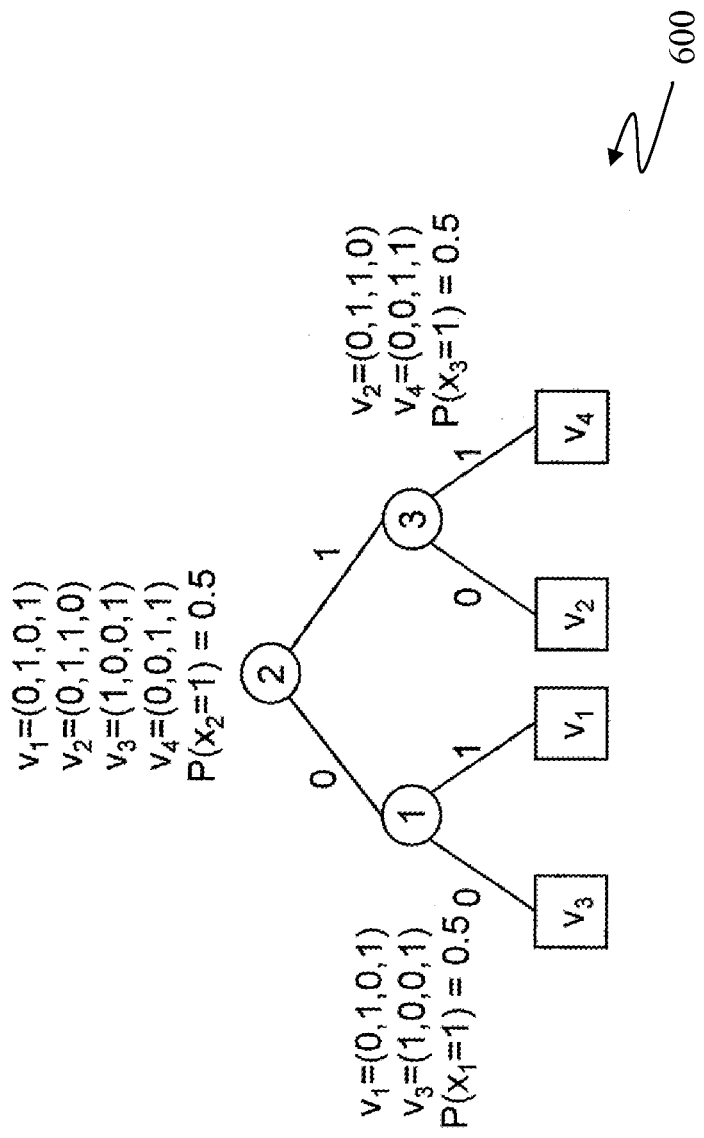
FIG. 11 is a schematic illustration showing a constructed search tree according to an algorithm for a set (V) of activity vectors according to an embodiment of the system described herein.

FIG. 11 is a schematic illustration 600 showing a constructed search tree according to an algorithm for a set (V) of activity vectors according to an embodiment of the system described herein. TABLE 1 shows the algorithm (Algorithm 1) for constructing the search tree for the set (V) of activity vectors. In accordance with the TABLE 1 and FIG. 11, in order to make the tree balanced, a splitting coordinate i is chosen such that probability $P(x_i=1)$ is closest to 0.5, that is:

$$i = \mathrm{argmin}_i |0.5 - P(x_i=1)|$$

All vectors where $x_i=0$ represents the left sub-tree and $x_i=1$ represents the right sub-tree. The splitting is then recursively repeated for each subset. In the obtained data structure, every non-leaf node contains information about the splitting coordinate. Each leaf node corresponds to a unique vector ($v_1$, $v_2$, $v_3$, $v_4$) from the set (V). The complexity of tree construction according to this embodiment is then $O(n\log_2(n))$.

TABLE 1

Alogorithm 1

```
1:  procedure CONSTRUCTSEARCHTREE(V)    ▷ V - set of
                                          activty vectors
2:      node n
3:      if |V| = 1 then
4:          n.vector ← v
5:          return n
6:      else
7:          n.split-cooredinate= argmin_i|0.5 − P(x_i = 1)|
8:      end if
9:      V_0 ← {v ∈ V : x_{n.split-coordinate} = 0}
10:     V_1 ← {v ∈ V : x_{n.split-coordinate} = 1}
11:     n.left-child ← ConstructSearchTree(V_0)
12:     n.right-child ← ConstructSearchTree(V_1)
13:     return n
14: end procedure
```

Figure 12:
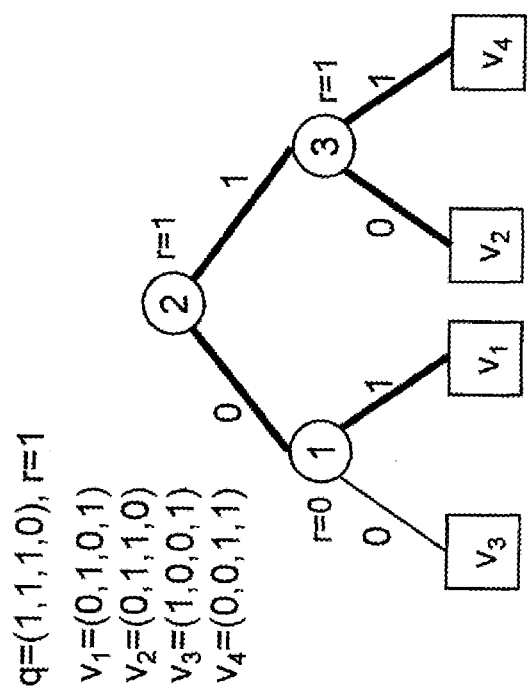
FIG. 12 is a schematic illustration showing a search algorithm applied to the constructed search tree of FIG. 11.

FIG. 12 is a schematic illustration 650 showing a search algorithm applied to the constructed search tree of FIG. 11. TABLE 2 shows the algorithm (Algorithm 2) for the search where q is the query vector, r is the search radius. The search algorithm traverses the nodes of the tree. In each node, the search algorithm updates the search radius (r). For any node, where Euclidean distance ($d_E$) is greater than the search radius (r) then the branch is pruned. In the illustrated example, the vector $v_3$ branch is pruned.

TABLE 2

Alogorithm 2

```
1:  procedure SEARCH(q. node, r)    ▷ q - query vector
2:                                   ▷ node - root of search subtree
3:                                   ▷ r - search radius
4:
5:      if r ≥ 0 then
6:          return
7:      end if
8:      if node is leaf then
9:          if d_E(q, node.vector) ≤ r then
10:             output node.vector
11:         end if
12:     end if
13:     i ← node.split-coordinate
14:     if q_i = 1 then
15:         search(q,node.left-child, r-1)
16:         search(q,node.right-child, r)
17:     else
18:         search,node.left-child, r-1)
19:         search(q,node.right-child, r)
20:     end if
21: end procedure
```

According to an embodiment of the system described herein, a proposed dependency mining method includes performing searches, like that described herein, over groups of vectors that have the same weight, specifically in which the weight of the query vector and weights of vectors in the searching set are used collectively. In the search tree construction phase, subsets of vectors with the same weight are used to create search trees for each subset. The search is then performed over each search tree. The output of the mining method according to the system described herein is the aggregated search results obtained from the search over each search tree. The complexity of a mining method according to this procedure is less than the complexity ($O(n^2)$) of the naïve method described elsewhere herein. The dependency definitions and criteria of the system described herein have been found to demonstrate acceptable quality compared to other dependency mining techniques while being less complex and performed faster.

In an embodiment, a dependency mining method according to the system described herein may be used in an advantageous way to, for example, prefetch data into a storage cache. Referring to FIG. 11, the analyzer 530 may perform the search tree construction and search tasks, to determine block dependencies according to the dependency mining method, and the determined block dependencies may be used to improve, for example, read hit rate of an LRU (least recently used) cache compared to other dependency mining techniques (like c-miner). Similarly, the dependency mining method according to the system described herein may be used in connection with other storage management techniques, such as data layout and/or disk scheduling techniques, for example.

FIG. 13 is a flow diagram 700 showing block dependency mining processing according to an embodiment of the system described herein. At a step 702, a block data source sequence is determined in connection with performing dependency mining thereon. After the step 702, processing proceeds a step 704 where the block data source sequence is split into subsequences. After the step 704, processing proceeds to a step 706 where activity patterns of blocks in the subsequences are determined. For example, the activity patterns may be activity vectors for occurrences of each block in the subsequences. After the step 706, processing proceeds to a step 708 where a search tree is constructed. After the step 708, processing proceeds to a test step 710 where it is determined whether another search tree is to be constructed for another set of activity vectors. In an embodiment, sets of activity vectors may be grouped according to weighting, specifically in which subsets of vectors with the same weight are used to create search trees for each subset. Accordingly, if, at the test step 710, it is determined that another search tree is to be constructed, processing proceeds back to the step 708.

If, at the test step 710, it is determined that no further search trees are to be constructed, processing proceeds to a step 712, where, based on dependency criteria, such as one or more dependency definitions, as discussed elsewhere herein, a search task is performed using each constructed search tree. Specifically, for example, the search task may be formulated as, by given query activity vector q, retrieve all activity vectors that are within distance r (search radius) of q, as further discussed elsewhere herein. The search task may include traversing and pruning branches of any search tree that do not satisfy the dependency definition. After the step 712, processing proceeds to a step 714 where an output of the dependency mining method is provided. In an embodiment, the output of the mining method according to the system described herein may be the aggregated search results obtained from the search over each search tree. After the step 714, processing proceeds to a step 716, where the output from the dependency mining method is used in a search management technique, such as a prefetch technique. After the step 716, processing is complete.

Various embodiments discussed herein may be combined with each other in appropriate combinations in connection with the system described herein. Additionally, in some instances, the order of steps in the flowcharts, flow diagrams and/or described flow processing may be modified, where appropriate. Further, various aspects of the system described herein may be implemented using software, hardware, a combination of software and hardware and/or other computer-implemented modules or devices having the described features and performing the described functions. Software implementations of the system described herein may include executable code that is stored in a computer readable medium and executed by one or more processors. The computer readable medium may include volatile memory and/or non-volatile memory, and may include, for example, a computer hard drive, ROM, RAM, flash memory, portable computer storage media such as a CD-ROM, a DVD-ROM, a flash drive and/or other drive with, for example, a universal serial bus (USB) interface, and/or any other appropriate tangible or non-transitory computer readable medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of performing dependency mining, comprising:
   determining a block data source access sequence;
   splitting the block data source access sequence into a plurality of subsequences that represent a sequence of block accesses;
   determining an access pattern for each of the plurality of subsequences;
   constructing at least one search tree based on the access pattern of each of the plurality of subsequences;
   performing a search task using the at least one search tree;
   determining dependent blocks using the at least one search tree and based on block dependency criteria, wherein each access pattern is an activity vector that identifies occurrences of a particular block in the plurality of subsequences;
   outputting a dependency mining search result based on the search task and the block dependency criteria; and
   using the dependency mining search result in a storage management process in connection with at least one of the determined dependent blocks, wherein the block dependency criteria includes a second block being dependent on a first block in response to a confidence factor being greater than a predetermined threshold, the confidence factor corresponding to a number of occurrences where both the first block and second block are active divided by a number of occurrences where the first block is active, wherein subsets of the plurality of subsequences are grouped into a plurality of subset groups according to weighting characteristics of the block dependency criteria for each access pattern of the plurality of subsequences.

2. The method according to claim 1, wherein each of the plurality of subset groups includes access patterns of blocks having a same weight.

3. The method according to claim 1, wherein more than one search tree is constructed, wherein the search task includes traversing the more than one search tree, and wherein the dependency mining search result is an aggregated result of traversing the more than one search tree.

4. The method according to claim 1, wherein the block dependency criteria includes, for a block (a) and a block (b), the block (b) is depended from block (a) if:

$$d_E(a,b) \leq (1-2p_{threshold}) \cdot \text{weight}(a) + \text{weight}(b)$$

$$\text{weight}(a) \geq m$$

where weight is a number of subsequences where identified block was active, m is a user defined threshold for the minimum number of subsequences where the identified block was active, $p_{threshold}$ is a user defined threshold from 0 to 1, and $d_E$ is a Euclidian distance in computational geometry.

5. The method according to claim 1, wherein performing the search task includes traversing the at least one search tree and pruning branches of the search tree according to a search radius criteria.

6. The method according to claim 1, wherein the storage management process includes a prefetch operation for at least one of the determined dependent blocks that is prefetched based on the dependency mining search result.

7. A non-transitory computer readable medium storing software for performing dependency mining, the software comprising:
   executable code that determines a block data source access sequence;
   executable code that splits the block data source access sequence into a plurality of subsequences that represent a sequence of block accesses;
   executable code that determines an access pattern for each of the plurality of subsequences;
   executable code that constructs at least one search tree based on the access pattern of each of the plurality of subsequences;
   executable code that performs a search task using the at least one search tree;
   executable code that determines dependent blocks using the at least one search tree and based on block dependency criteria, wherein each access pattern is an activity vector that identifies occurrences of a particular block in the plurality of subsequences;

executable code that outputs a dependency mining search result based on the search task and the block dependency criteria; and executable code that uses the dependency mining search result in a storage management process in connection with at least one of the determined dependent blocks, wherein the block dependency criteria includes a second block being dependent on a first block in response to a confidence factor being greater than a predetermined threshold, the confidence factor corresponding to a number of occurrences where both the first block and second block are active divided by a number of occurrences where the first block is active, wherein subsets of the plurality of subsequences are grouped into a plurality of subset groups according to weighting characteristics of the block dependency criteria for each access pattern of the plurality of subsequences.

8. The non-transitory computer readable medium according to claim 7, wherein each of the plurality of subset groups includes access patterns of blocks having a same weight.

9. The non-transitory computer readable medium according to claim 7, wherein more than one search tree is constructed, wherein the search task includes traversing the more than one search tree, and wherein the dependency mining search result is an aggregated result of traversing the more than one search tree.

10. The non-transitory computer readable medium according to claim 7, wherein the block dependency criteria includes, for a block (a) and a block (b), the block (b) is depended from block (a) if:

$$d_E(a,b) \leq (1-2p_{threshold}) \cdot \text{weight}(a) + \text{weight}(b)$$

$$\text{weight}(a) \geq m$$

where weight is a number of subsequences where identified block was active, m is a user defined threshold for the minimum number of subsequences where the identified block was active, $p_{threshold}$ is a user defined threshold from 0 to 1, and $d_E$ is a Euclidian distance in computational geometry.

11. The non-transitory computer readable medium according to claim 7, wherein the executable code that performs the search task includes executable code that traverses the at least one search tree and prunes branches of the search tree according to a search radius criteria.

12. The non-transitory computer readable medium according to claim 7, wherein the storage management process includes a prefetch operation for at least one of the determined dependent blocks that is prefetched based on the dependency mining search result.

13. A storage system, comprising:
a storage device that stores data;
an analyzer that monitors workload of the storage device;
a non-transitory computer readable medium storing software, executable by at least one processor of the analyzer, for performing dependency mining, the software comprising:

executable code that determines a block data source access sequence of the data stored on the storage device;

executable code that splits the block data source access sequence into a plurality of subsequences that represent a sequence of block accesses;

executable code that determines an access pattern for each of the plurality of subsequences;

executable code that constructs at least one search tree based on the access pattern of each of the plurality of subsequences;

executable code that performs a search task using the at least one search tree;

executable code that determines dependent blocks using the at least one search tree and based on block dependency criteria, wherein each access pattern is an activity vector that identifies occurrences of a particular block in the plurality of subsequences;

executable code that outputs a dependency mining search result based on the search task and the block dependency criteria; and executable code that uses the dependency mining search result in a storage management process in connection with at least one of the determined dependent blocks, wherein the block dependency criteria includes a second block being dependent on a first block in response to a confidence factor being greater than a predetermined threshold, the confidence factor corresponding to a number of occurrences where both the first block and second block are active divided by a number of occurrences where the first block is active, wherein subsets of the plurality of subsequences are grouped into a plurality of subset groups according to weighting characteristics of the block dependency criteria for each access pattern of the plurality of subsequences.

14. The storage system according to claim 13, wherein more than one search tree is constructed, wherein the search task includes traversing the more than one search tree, and wherein the dependency mining search result is an aggregated result of traversing the more than one search tree.

15. The storage system according to claim 13, wherein the block dependency criteria includes, for a block (a) and a block (b), the block (b) is depended from block (a) if:

$$d_E(a,b) \leq (1-2p_{threshold}) \cdot \text{weight}(a) + \text{weight}(b)$$

$$\text{weight}(a) \geq m$$

where weight is a number of subsequences where identified block was active, m is a user defined threshold for the minimum number of subsequences where the identified block was active, $p_{threshold}$ is a user defined threshold from 0 to 1, and $d_E$ is a Euclidian distance in computational geometry.

16. The storage system according to claim 13, wherein the storage management process includes a prefetch operation for at least one of the determined dependent blocks that is prefetched based on the dependency mining search result.

* * * * *